(12) United States Patent
Imanishi et al.

(10) Patent No.: US 9,813,741 B2
(45) Date of Patent: Nov. 7, 2017

(54) CONTROLLER, CONTROL METHOD, COMPUTER PROGRAM, AND VIDEO TRANSMISSION SYSTEM

(71) Applicant: SONY CORPORATION, Tokyo (JP)

(72) Inventors: Masayuki Imanishi, Tokyo (JP);
Masaaki Shino, Kanagawa (JP);
Yoshiyuki Kunito, Kanagawa (JP);
Yasuto Masuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 14/780,191

(22) PCT Filed: Mar. 27, 2014

(86) PCT No.: PCT/JP2014/058897
§ 371 (c)(1),
(2) Date: Sep. 25, 2015

(87) PCT Pub. No.: WO2014/162981
PCT Pub. Date: Oct. 9, 2014

(65) Prior Publication Data
US 2016/0044342 A1 Feb. 11, 2016

(30) Foreign Application Priority Data
Apr. 5, 2013 (JP) ................................ 2013-079393

(51) Int. Cl.
*H04N 7/173* (2011.01)
*H04N 21/2385* (2011.01)
(Continued)

(52) U.S. Cl.
CPC ... *H04N 21/2385* (2013.01); *H04N 21/23439* (2013.01); *H04N 21/242* (2013.01);
(Continued)

(58) Field of Classification Search
CPC ......... H04N 21/4384; H04N 21/64322; H04N 21/2662; H04N 21/6125; H04N 21/2385;
(Continued)

(56) References Cited

U.S. PATENT DOCUMENTS 6,085,222 A * 7/2000 Fujino ................. H04L 12/2602
709/202
8,752,100 B2 * 6/2014 Ramakrishnan ... H04N 7/17318
709/231
(Continued)

FOREIGN PATENT DOCUMENTS

EP 2 124 451 A2 11/2009
EP 2 317 754 A1 5/2011
(Continued)

OTHER PUBLICATIONS

International Search Report dated Jun. 3, 2014 in PCT/JP2014/058897.
(Continued)

*Primary Examiner* — Michael B Pierorazio
(74) *Attorney, Agent, or Firm* — Oblon, McClelland, Maier & Neustadt, L.L.P.

(57) ABSTRACT

[Object] To provides a controller capable of switching a video so that the video is not distorted on the receiving side when the video is transmitted using IP multicast
[Solution] There is provided a controller including a bandwidth reservation unit configured to, when an instruction given to a receiving device that receives a first video stream transmitted via IP multicast to receive a second video stream after receiving the first video stream is acquired, acquire information on a status of a network topology and a transmitted video stream and to reserve a network bandwidth for transmitting the second video stream in addition to the first video stream, and a reception instruction unit configured to send out an instruction to receive the second video stream to (Continued)

the receiving device by using the network bandwidth reserved by the bandwidth reservation unit.

12 Claims, 9 Drawing Sheets

(51) Int. Cl.
    *H04N 21/262* (2011.01)
    *H04N 21/6371* (2011.01)
    *H04N 21/6405* (2011.01)
    *H04N 21/2343* (2011.01)
    *H04N 21/242* (2011.01)
    *H04N 21/43* (2011.01)
    *H04N 21/61* (2011.01)

(52) U.S. Cl.
    CPC ....... *H04N 21/262* (2013.01); *H04N 21/4307* (2013.01); *H04N 21/6125* (2013.01); *H04N 21/6371* (2013.01); *H04N 21/6405* (2013.01)

(58) Field of Classification Search
    CPC ........... H04N 21/4302; H04N 21/2183; H04N 21/85406
    USPC .......................................................... 725/109
    See application file for complete search history.

(56) References Cited

U.S. PATENT DOCUMENTS

| | | | | |
|---|---|---|---|---|
| 8,756,341 | B1* | 6/2014 | Richardson | H04L 67/2814 370/351 |
| 8,762,564 | B1* | 6/2014 | Philpott | H04L 65/4084 709/217 |
| 9,264,508 | B2* | 2/2016 | Wolf | H04L 67/2842 |
| 2006/0002551 | A1* | 1/2006 | Brown | H04N 7/17318 380/217 |
| 2008/0037420 | A1* | 2/2008 | Tang | H04L 1/1607 370/229 |
| 2008/0155612 | A1 | 6/2008 | Ikeda et al. | |
| 2009/0100459 | A1* | 4/2009 | Riedl | H04N 21/2385 725/35 |
| 2009/0150943 | A1* | 6/2009 | Vasudevan | H04N 21/2385 725/86 |
| 2009/0193469 | A1* | 7/2009 | Igarashi | H04N 7/17309 725/56 |
| 2010/0086020 | A1* | 4/2010 | Schlack | H04L 67/322 375/240.01 |
| 2010/0115627 | A1* | 5/2010 | Chow | G06F 21/10 726/28 |
| 2010/0121936 | A1* | 5/2010 | Liu | H04N 5/44543 709/217 |
| 2011/0138431 | A1* | 6/2011 | Cedervall | H04N 21/2385 725/109 |
| 2011/0188439 | A1* | 8/2011 | Mao | H04N 7/17318 370/312 |
| 2011/0197239 | A1* | 8/2011 | Schlack | H04L 41/0896 725/95 |
| 2011/0255555 | A1* | 10/2011 | Alexander | H04N 21/23805 370/468 |
| 2011/0302313 | A1* | 12/2011 | Diab | G06Q 20/10 709/227 |
| 2012/0072607 | A1 | 3/2012 | Kawashima et al. | |
| 2012/0195362 | A1* | 8/2012 | Benno | H04N 21/222 375/240.01 |
| 2012/0213295 | A1 | 8/2012 | Quere et al. | |
| 2012/0331513 | A1* | 12/2012 | Yamagishi | H04N 21/2362 725/95 |
| 2013/0024901 | A1* | 1/2013 | Sharif-Ahmadi | G06F 17/30017 725/114 |
| 2013/0091521 | A1* | 4/2013 | Phillips | H04N 21/23424 725/35 |
| 2013/0132986 | A1* | 5/2013 | Mack | H04L 65/605 725/14 |
| 2014/0074988 | A1* | 3/2014 | Parekh | H04N 21/23424 709/219 |
| 2014/0112144 | A1 | 4/2014 | Takazoe | |
| 2014/0150046 | A1* | 5/2014 | Epstein | H04N 21/23439 725/126 |
| 2014/0189754 | A1* | 7/2014 | Major | H04L 65/4076 725/67 |
| 2014/0201796 | A1* | 7/2014 | Moon | H04H 60/13 725/110 |
| 2014/0230003 | A1* | 8/2014 | Ma | H04N 21/231 725/115 |
| 2014/0282766 | A1* | 9/2014 | Good | H04L 65/607 725/93 |
| 2014/0282777 | A1* | 9/2014 | Gonder | H04L 65/605 725/109 |
| 2015/0043379 | A1* | 2/2015 | Shimokuni | H04L 45/586 370/254 |
| 2015/0052570 | A1* | 2/2015 | Lee | H04N 21/2187 725/110 |
| 2015/0263916 | A1* | 9/2015 | Phillips | H04L 43/08 709/224 |
| 2015/0358662 | A1* | 12/2015 | Drouin | H04N 21/2668 725/97 |

FOREIGN PATENT DOCUMENTS

| | | |
|---|---|---|
| JP | 2011-114490 A | 6/2011 |
| JP | 2012-65281 A | 3/2012 |
| JP | 2012-256971 A | 12/2012 |
| JP | 2013-5413 A | 1/2013 |
| JP | 2013-509768 A5 | 3/2013 |
| WO | WO 2011/071439 A1 | 6/2011 |
| WO | WO 2012/053047 A1 | 4/2012 |

OTHER PUBLICATIONS

Extended European Search Report dated Nov. 7, 2016 in Patent Application No. 14779839.1.

\* cited by examiner

CONTROLLER, CONTROL METHOD, COMPUTER PROGRAM, AND VIDEO TRANSMISSION SYSTEM

TECHNICAL FIELD

The present disclosure relates to a controller, a control method, a computer program, and a video transmission system.

BACKGROUND ART

A technology related to a method of switching video sources in a video system that makes one video source from a plurality of video sources be selected and displayed is disclosed in Patent Literature 1, for example.

CITATION LIST

Patent Literature

Patent Literature 1: JP 2011-114490A

SUMMARY OF INVENTION

Technical Problem

In such video systems in which one video source among a plurality of video sources is selected, cases are increasing in which IP multicasting technology is used to transmit the video sources. When transmitting a video using IP multicast technology, the receiving side is required to switch the video so that the video is not distorted when the video is switched.

Accordingly, the present disclosure provides a controller, a control method, a computer program, and a video transmission system that are novel and improved and that are capable of switching a video so that the video is not distorted on the receiving side when the video is transmitted using IP multicast.

Solution to Problem

According to the present disclosure, there is provided a controller including: a bandwidth reservation unit configured to, when an instruction given to a receiving device that receives a first video stream transmitted via IP multicast to receive a second video stream after receiving the first video stream is acquired, acquire information on a status of a network topology and a transmitted video stream and to reserve a network bandwidth for transmitting the second video stream in addition to the first video stream; and a reception instruction unit configured to send out an instruction to receive the second video stream to the receiving device by using the network bandwidth reserved by the bandwidth reservation unit.

According to the present disclosure, there is provided a control method including the steps of: acquiring, when an instruction given to a receiving device that receives a first video stream transmitted via IP multicast to receive a second video stream after receiving the first video stream is acquired, information on a status of a network topology and a transmitted video stream and reserving a network bandwidth for transmitting the second video stream in addition to the first video stream; and sending out an instruction to receive the second video stream to the receiving device by using the reserved network bandwidth.

According to the present disclosure, there is provided a computer program causing a computer to execute the steps of: acquiring, when an instruction given to a receiving device that receives a first video stream transmitted via IP multicast to receive a second video stream after receiving the first video stream is acquired, information on a status of a network topology and a transmitted video stream and reserving a network bandwidth for transmitting the second video stream in addition to the first video stream; and sending out an instruction to receive the second video stream to the receiving device by using the reserved network bandwidth.

According to the present disclosure, there is provided a video transmission system including: one or more transmitting devices that transmit a video stream via IP multicast; a receiving device that receives the video stream transmitted from the one or more transmitting devices via IP multicast; and a controller that transmits an instruction to receive a video stream to the receiving device. The controller includes a bandwidth reservation unit configured to, when an instruction given to the receiving device that receives a first video stream transmitted from the one or more transmitting devices via IP multicast to receive a second video stream after receiving the first video stream is acquired, acquire information on a status of a network topology and a transmitted video stream and to reserve a network bandwidth for transmitting the second video stream in addition to the first video stream, and a reception instruction unit configured to send out an instruction to receive the second video stream to the receiving device by using the network bandwidth reserved by the bandwidth reservation unit.

Advantageous Effects of Invention

As described above, the present disclosure is capable of providing a controller, a control method, a computer program, and a video transmission system that are novel and improved and that are capable of switching a displayed video without the video being distorted when a video is transmitted using IP multicast.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

Note that the description will be given in the following order.

<1. One Embodiment of Present Disclosure>
[Exemplary Overall Configuration of System]
[Exemplary Functional Configuration of Network Manager]
[Exemplary Operation of Network Manager]
[Exemplary Operation of Video Transmission System]
[Exemplary Format of Message]
[Modification]
<2. Summary>

1. One Embodiment of the Present Disclosure

[Exemplary Overall Configuration of System]

Figure 1:
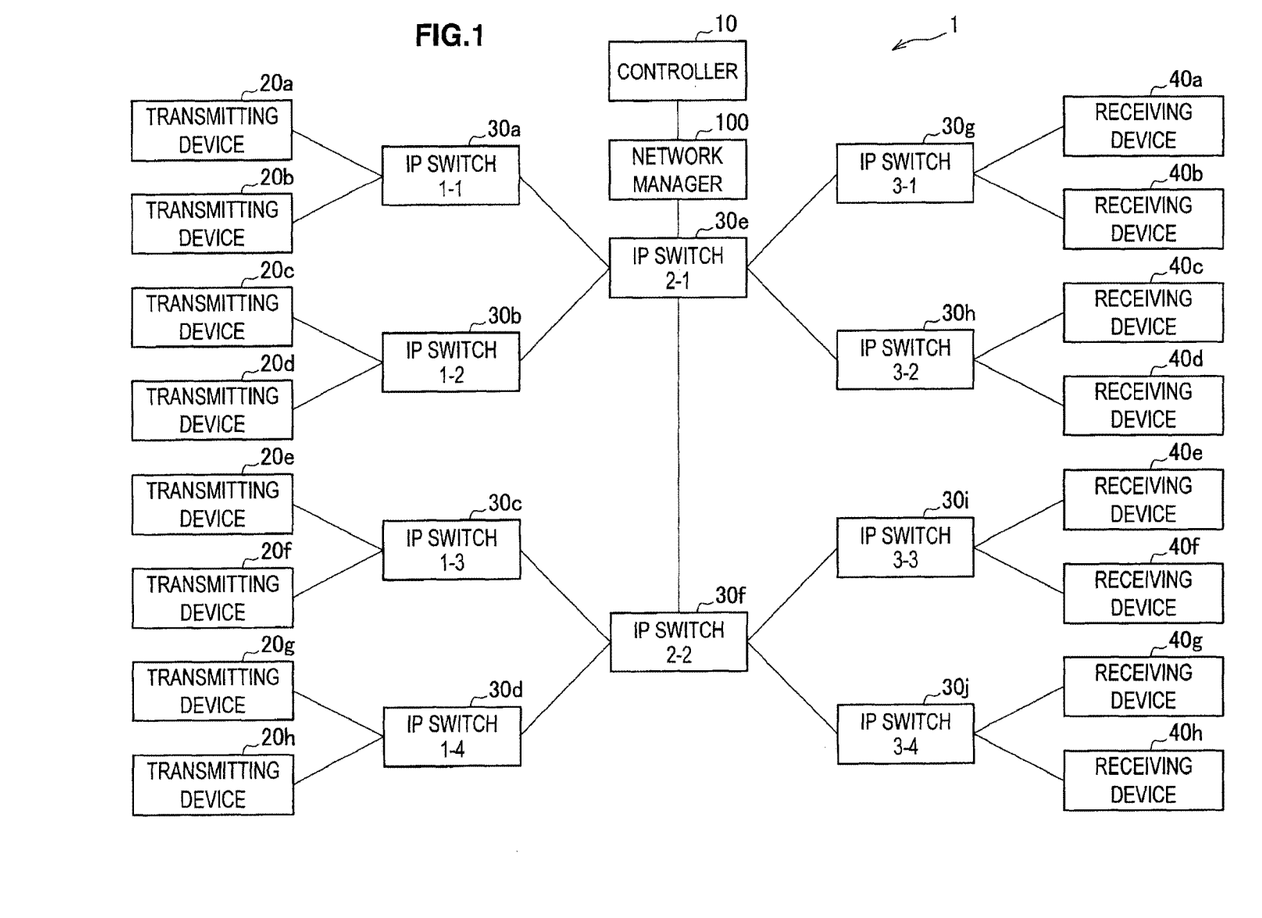
FIG. 1 is an explanatory drawing illustrating an exemplary overall configuration of a video transmission system 1 according to an embodiment of the present disclosure.

An exemplary overall configuration of a video transmission system according to an embodiment of the present disclosure will be described first with reference to the drawings. FIG. 1 is an explanatory drawing illustrating the exemplary overall configuration of a video transmission system 1 according to an embodiment of the present disclosure. Hereinafter, the exemplary overall configuration of the video transmission system 1 according to an embodiment of the present disclosure will be described using FIG. 1.

As illustrated in FIG. 1, the video transmission system 1 according to an embodiment of the present disclosure is configured so as to include a controller 10, transmitting devices 20a to 20h, IP switches 30a to 30j, receiving devices 40a to 40h, and a network manager 100.

The controller 10 controls the overall operation of the video transmission system 1. Conceived forms of the controller 10 may be, for example, a personal computer, a tablet terminal, or a workstation. For example, the controller 10 designates which of the videos output from the transmitting devices 20a to 20h are to be received by which of the receiving devices 40a to 40h and transmits the details of the designation to the network manager 100.

The network manager 100 is a device that manages the status of the video transmission system 1 illustrated in FIG. 1 and, on the basis of the details transmitted from the controller 10, makes the receiving devices 40a to 40h receive the videos output by the transmitting devices 20a to 20h. The network manager 100 may function as the controller of the present disclosure. The network manager 100 manages the network topology status of the video transmission system 1 by acquiring information related to an IP network of each of the devices from the transmitting devices 20a to 20h, the IP switches 30a to 30j, and the receiving devices 40a to 40h.

The transmitting devices 20a to 20h are compatible with IP multicast and are each a device that distributes a video as a video stream via IP multicast. The transmitting devices 20a to 20h may be image pickup devices that take videos, for example. When the transmitting devices 20a to 20h are image pickup devices, the transmitting devices 20a to 20h distribute the taken videos as video streams via IP multicast. In the exemplary overall configuration of the video transmission system 1 illustrated in FIG. 1, eight transmitting devices 20a to 20h are illustrated; however, the present disclosure is not limited to the above example. Furthermore, the transmitting devices 20a to 20h may be devices that distributes, via IP multicast, videos that has been taken in advance.

The IP switches 30a to 30j are switches that are compatible with IP multicast and relay the video streams that are distributed to the receiving devices 40a to 40h from the transmitting devices 20a to 20h via IP multicast. In the present embodiment, a description is given that the IP switches 30a to 30j are connected in a manner illustrated in FIG. 1; however, it goes without saying that the number and the connection configuration of the IP switches 30a to 30j are not limited to the above example.

In FIG. 1, each of the IP switches 30a to 30j is illustrated with a number allocated thereto. In "IP switch n-m", each n is numbered as 1, 2, or 3 in order of the closeness to the transmitting devices 20a to 20h. Furthermore, in "IP switch n-m", each m is allocated with a number in order to distinguish the IP switches that are numbered with the same number n.

The receiving devices 40a to 40h are compatible with IP multicast and are each a device that receives the video streams that have been distributed from each of the transmitting devices 20a to 20h via IP multicast. The video streams received by the receiving devices 40a to 40h may be compressed video streams or may be uncompressed video streams that are not compressed.

On the basis of the details transmitted from the controller 10, the network manager 100 makes the receiving devices 40a to 40h receive videos output by the transmitting devices 20a to 20h. In the present embodiment, since the transmitting devices 20a to 20h distribute video streams via IP multicast, the receiving devices 40a to 40h start receiving the video streams by issuing a Join command. Furthermore, the receiving devices 40a to 40h end the reception of the video streams by issuing a Leave command.

However, in a state in which the receiving devices 40a to 40h are already receiving a video stream, the video stream cannot be switched instantaneously when switching to and receiving another video stream by issuing a Join command after issuing a Leave command. After the reception of the video stream is stopped, it takes time until the reception the other video stream is started, and the video is not displayed at the switching timing of the video stream when the video is displayed based on the video stream received by the receiving devices 40a to 40h.

Accordingly, in the present embodiment, when the receiving devices 40a to 40h are newly receiving a video stream, the reception of the video stream that is to be newly received is started without stopping the reception of the video stream that is being received. Then, the receiving devices 40a to 40h receiving the new video stream stops the reception of the video stream that has been received up until then when a state in which a video can be output from the new video stream is reached.

In order to perform the video stream reception start processing and stop processing described above in the receiving devices 40a to 40h, the network manager 100, using the information on the network topology status and the status of the stream that is already flowing through the network, secures a bandwidth for the video stream to be newly received by the receiving devices 40a to 40h.

When the bandwidth for the video stream to be newly received by the receiving devices 40a to 40h is secured, the network manager 100 instructs the reception of the new stream to the receiving devices 40a to 40h. The receiving devices 40a to 40h receiving the reception instruction from the network manager 100 are capable of receiving the new video stream that is transmitted by using the bandwidth secured by the network manager 100.

The video transmission system 1 illustrated in FIG. 1 may be a system provided in a broadcasting station, for example. In the case of a system in which the video transmission system 1 is provided in a broadcasting station, the transmitting devices 20a to 20h may be devices that takes videos and distributes the taken video via IP multicast in real time, and the receiving devices 40a to 40h may be editors that edit the videos taken by the transmitting devices 20a to 20h. The videos that has been taken by the transmitting devices 20a to 20h and that are edited by the receiving devices 40a to 40h may be subsequently transmitted from the broadcasting station as broadcast waves.

Note that in FIG. 1, the controller 10 and the network manager 100 are illustrated as different devices; however, the present disclosure is not limited to the above example. A configuration in which the function of the controller 10 and the function of the network manager 100 are provided inside the same device is also included in the technical scope of the present disclosure.

As above, the exemplary overall configuration of the video transmission system 1 according to an embodiment of the present disclosure has been described using FIG. 1. Subsequently, an exemplary functional configuration of the network manager 100 according to an embodiment of the present disclosure will be described.

[Exemplary Functional Configuration of Network Manager]

Figure 2:
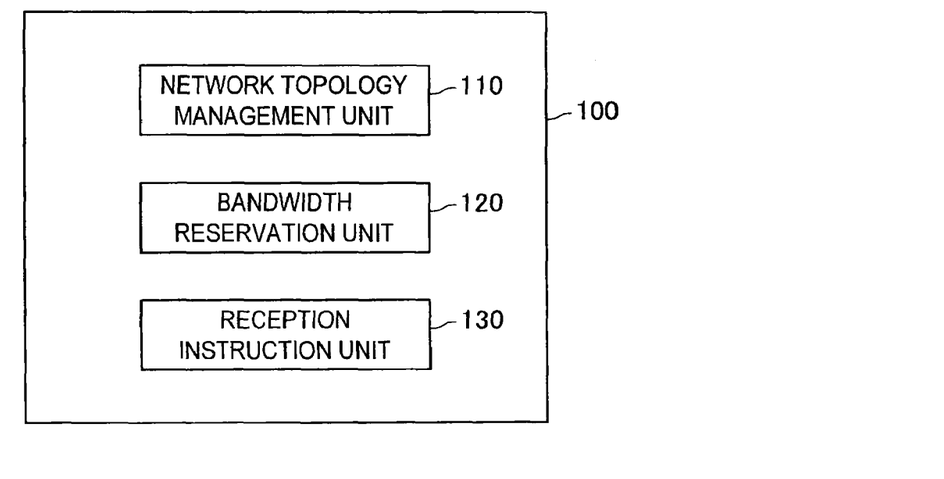
FIG. 2 is an explanatory drawing illustrating an exemplary functional configuration of a network manager 100 according to an embodiment of the present disclosure.

FIG. 2 is an explanatory drawing illustrating an exemplary functional configuration of the network manager 100 according to an embodiment of the present disclosure. Hereinafter, the exemplary functional configuration of the network manager 100 according to an embodiment of the present disclosure will be described using FIG. 2.

As illustrated in FIG. 2, the network manager 100 according to an embodiment of the present disclosure is configured so as to include a network topology management unit 110, a bandwidth reservation unit 120, and a reception instruction unit 130.

The network topology management unit 110 acquires the network topology of the video transmission system 1 from each of the devices, in other words, the network topology management unit 110 acquires the connection configuration of each device in the video transmission system 1 from each of the devices. The information on the network topology of the video transmission system 1 managed by the network topology management unit 110 is used by the bandwidth reservation unit 120 for bandwidth reservation.

The network topology management unit 110 can manage the network topology of the video transmission system 1 by setting the IP addresses of the devices connected to the video transmission system 1 using Dynamic Host Configuration Protocol (DHCP), for example, and registering the IP addresses of the devices in the network topology management unit 110. The network topology management unit 110 may manage the network topology of the video transmission system 1 by collecting the information of the devices connected to the video transmission system 1 using Link Layer Discovery Protocol (LLDP), for example. It goes without saying that the examples cited above are merely examples and the network topology management unit 110 may manage the network topology of the video transmission system 1 with other methods.

If there are changes in the information of the network topology and the information of the video stream that is currently being transmitted, the devices notifies the details of the changes to the network manager 100. Since the network manager 100 manages the IP switches 30a to 30j, the information of the network topology can be generated automatically by acquiring information from the IP switches 30a to 30j.

The network topology management unit 110 collects, as network topology information, IDs that discriminate the devices (the transmitting devices 20a to 20h, the IP switches 30a to 30j, and the receiving devices 40a to 40h) from each other, arrangement of the Ethernet (registered trademark) information, arrangement of the Ethernet information to which each Ethernet is connected, and information of the video stream that each device is currently receiving, for example.

The bandwidth reservation unit 120 reserves the bandwidth for the video stream that is to be received by the receiving devices 40a to 40h so that the video streams can be switched and received by the receiving devices 40a to 40h without any disruption in the video. The bandwidth reservation unit 120 reserves the bandwidth for the video stream that is to be received by the receiving devices 40a to 40h on the basis of information on the network topology status managed by the network topology management unit 110 and the video stream that is transmitted in the video transmission system 1.

More specifically, when the bandwidth reservation unit 120 acquires the instruction given to the receiving devices 40a to 40h from the controller 10 to receive the video stream, the bandwidth reservation unit 120 calculates the network bandwidth that can be reserved on the basis of the information on the network topology status managed by the network topology management unit 110 and the video stream that is transmitted in the video transmission system 1. Then, when the network bandwidth that can be reserved is calculated, the bandwidth reservation unit 120 changes the bandwidth reservation setting of the IP switches 30a to 30j for the video stream that is to be newly received (after the switching) by the receiving devices 40a to 40h.

Note that when a new video stream is received by the receiving devices 40a to 40h and the video stream that has been received until then it stopped, the bandwidth reservation unit 120 may release the network bandwidth for the video stream that had been received until then. When a video stream that is no longer received by a receiving device (for example, the receiving device 40a) among the receiving devices 40a to 40h is not received by either one of the other receiving devices 40b to 40h, the bandwidth reservation unit 120 may release the bandwidth that has been used by the video stream that is no longer received.

On the basis of an instruction, which has been acquired from the controller 10, given to the receiving devices 40a to

40h to receive the video stream, the reception instruction unit 130 sends out an instruction to the receiving devices 40a to 40h to receive the video stream. The video stream that is received by the receiving devices 40a to 40h upon instruction from the reception instruction unit 130 is transmitted from the transmitting devices 20a to 20h to the receiving devices 40a to 40h through the IP switches 30a to 30j by using the bandwidth reserved by the bandwidth reservation unit 120.

As described above, in the present embodiment, when receiving the reception instruction from the reception instruction unit 130, the receiving devices 40a to 40h that are receiving the video stream receives, in addition to the video stream that is being received, the new video stream on the basis of the reception instruction. Then, at the point when an output of the video of the new video stream becomes possible, the receiving devices 40a to 40h promptly request the reception of the video stream that has been received until then to be stopped.

With the configuration illustrated in FIG. 2, the network manager 100 is capable of switching the video without the video being distorted in each of the receiving devices 40a to 40h when transmitting the video stream using IP multicast.

As above, the exemplary functional configuration of the network manager 100 according to an embodiment of the present disclosure has been described. Subsequently, an exemplary operation of the network manager 100 according to an embodiment of the present disclosure will be described.

[Exemplary Operation of Network Manager]

Figure 3:
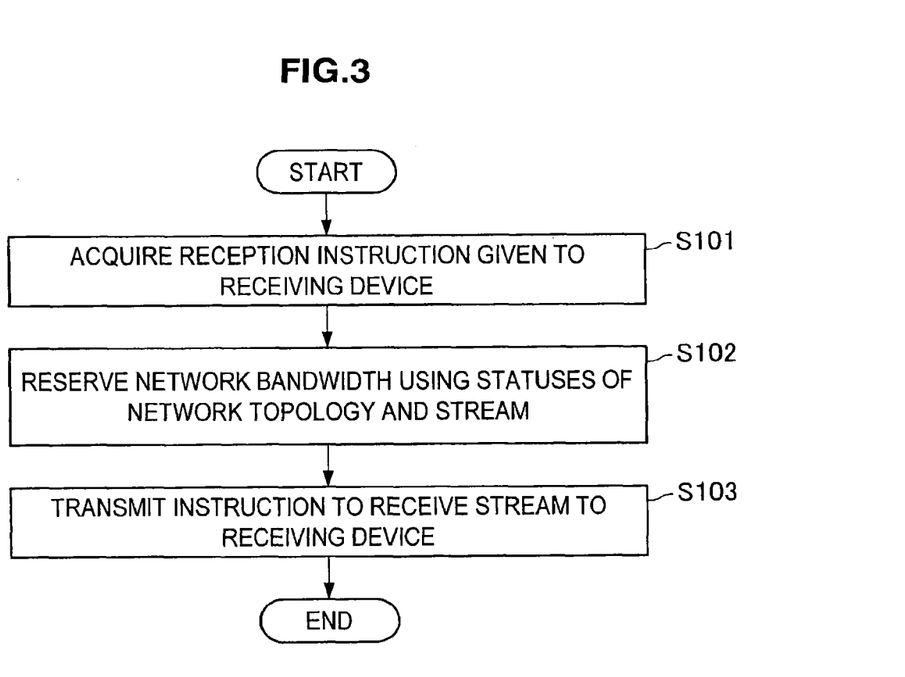
FIG. 3 is a flowchart illustrating an exemplary operation of the network manager 100 according to an embodiment of the present disclosure.

FIG. 3 is a flowchart illustrating an exemplary operation of the network manager 100 according to an embodiment of the present disclosure. Illustrated in FIG. 3 is the exemplary operation of the network manager 100 from when the network manager 100 acquires an instruction given to the receiving devices 40a to 40h from the controller 10 to receive the video stream until sending out an instruction to receive the video stream to the receiving devices 40a to 40h. Hereinafter, the exemplary operation of the network manager 100 according to an embodiment of the present disclosure will be described using FIG. 3.

When the bandwidth reservation unit 120, for example, acquires the instruction given to the receiving devices 40a to 40h from the controller 10 to receive the video stream (step S101), the network manager 100 calculates, with the bandwidth reservation unit 120, the network bandwidth that can be reserved on the basis of the information on the network topology status managed by the network topology management unit 110 and the video stream that is transmitted in the video transmission system 1. Then, when the network bandwidth that can be reserved is calculated, the bandwidth reservation unit 120 changes the bandwidth reservation setting of the IP switches 30a to 30j for the video stream that is to be newly received (after the switching) by the receiving devices 40a to 40h so as to reserve the network bandwidth (step S102).

After the network bandwidth for the video stream that is to be received by the receiving devices 40a to 40h is reserved in the bandwidth reservation unit 120 in step S102 described above, the network manager 100 subsequently sends out an instruction to receive the video stream to the receiving devices 40a to 40h from the reception instruction unit 130 on the basis of the instruction given to the receiving devices 40a to 40h to receive the video stream acquired from the controller 10 (step S103). On the basis of the instruction from the reception instruction unit 130 to receive the video stream, the receiving devices 40a to 40h stops receiving the video stream that has been received until then after starting to receive the new video stream.

By executing the operation illustrated in FIG. 3, the network manager 100 is capable of switching the video in each of the receiving devices 40a to 40h without the video being distorted when transmitting the video stream using IP multicast.

As above, the exemplary operation of the network manager 100 according to an embodiment of the present disclosure has been described using FIG. 3. Subsequently, an exemplary operation of the video transmission system 1 according to an embodiment of the present disclosure will be described in more detail.

[Exemplary Operation of Video Transmission System]

Figure 4:
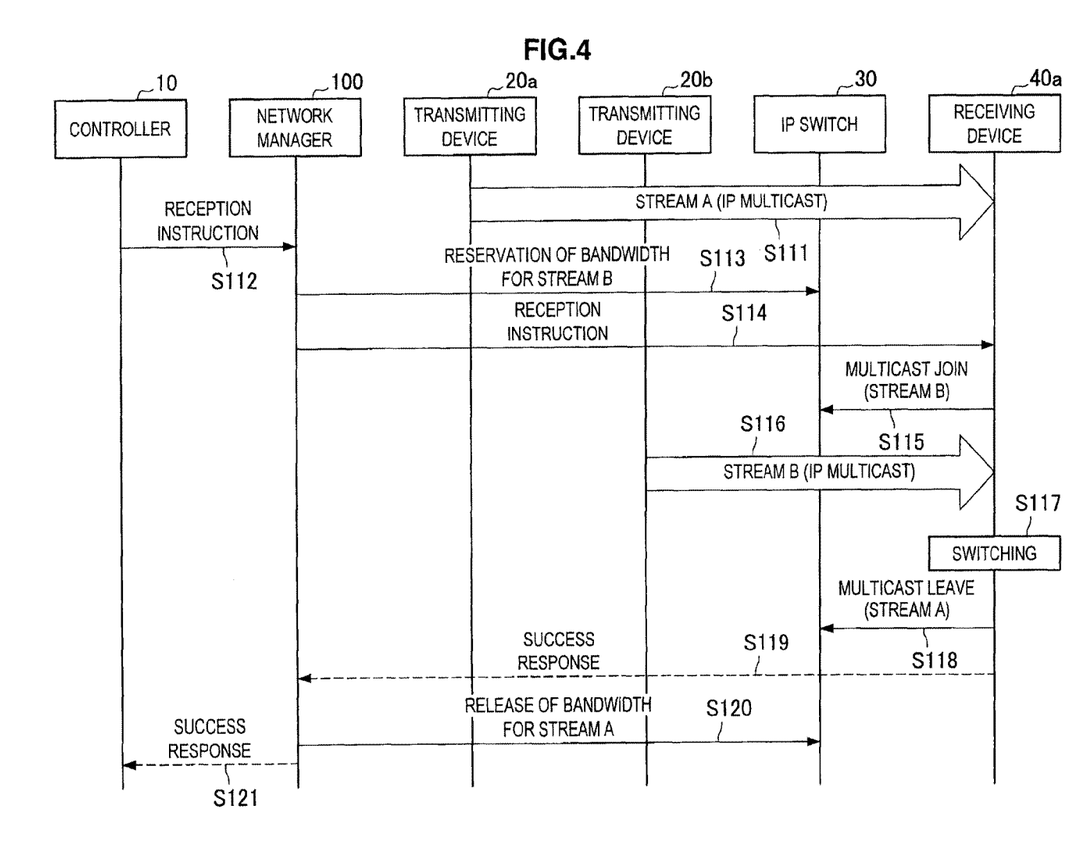
FIG. 4 is a flowchart illustrating an exemplary operation of a video transmission system 1 according to an embodiment of the present disclosure.

FIG. 4 is a flowchart illustrating an exemplary operation of the video transmission system 1 according to an embodiment of the present disclosure. Illustrated in FIG. 4 is the exemplary operation of the video transmission system 1 in a case in which, while a video stream distributed from the transmitting device 20a via IP multicast is received by the receiving device 40a, an instruction to receive another video stream is sent out to the receiving device 40a from the controller 10. Hereinafter, the exemplary operation of the video transmission system 1 according to an embodiment of the present disclosure will be described using FIG. 4.

In a state in which a video stream (referred to as Stream A) distributed from the transmitting device 20a via IP multicast is received by the receiving device 40a (step S111), the controller 10 sends out to the network manager 100 an instruction given to the receiving device 40a to receive another video stream (referred to as Stream B that is distributed from the transmitting device 20b via IP multicast) (step S112) On the Basis of the reception command from the controller 10, the network manager 100 calculates the network bandwidth that can be reserved for the transmission of Stream B, and reserves a bandwidth for Stream B in the IP switch 30 (a collective term for the IP switches 30a to 30j) (step S113).

When the bandwidth for Stream B is reserved, the network manager 100 sends out an instruction to receive Stream B to the receiving device 40a (step S114). The receiving device 40a receiving the instruction to receive Stream B from the network manager 100 first sends out, to the IP switch 30, a Join command for receiving Stream B distributed via IP multicast (step S115).

When the receiving device 40a sends out the Join command, Stream B that is distributed from the transmitting device 20b via IP multicast reaches the receiving device 40a through the IP switch 30 (step S116). When Stream B that is distributed from the transmitting device 20b via IP multicast is received, the receiving device 40a switches from the output of the video based on Stream A that has been received until then to the output of the video based on Stream B (step S117). When the output of the video based on Stream B becomes possible, the receiving device 40a promptly sends out a Leave command for stopping the reception of Stream A (step S118).

When the receiving device 40a sends out the Leave command, transmission of Stream A to the receiving device 40a is stopped. The receiving device 40a notifies the network manager 100 a success response of the Leave command (step S119).

When receiving the success response of the Leave command to Stream A from the receiving device 40a, the network manager 100 releases the network bandwidth for Stream A (step S120). The network manager 100, on the basis of the success response of the Leave command, releasing the network bandwidth for Stream A that is no longer received by the receiving device 40a prevents unnecessary occupation of the network bandwidth.

When releasing the network bandwidth for Stream A, the network manager 100 sends out, to the controller 10, a success response for notifying that the switching to Stream B in the receiving device 40a has been a success (step S121). With the success response from the network manager 100, the controller 10 is capable of knowing that the switching to Stream B has succeeded in the receiving device 40a.

By executing the operation illustrated in FIG. 4, the video transmission system 1 according to an embodiment of the present disclosure is capable of switching the video in each of the receiving devices 40a to 40h without the video being distorted when transmitting the video stream using IP multicast.

As above, the exemplary operation of the video transmission system 1 according to an embodiment of the present disclosure has been described using FIG. 4. A manner in which the stream flows through the network in the video transmission system 1 according to an embodiment of the present disclosure will be described now using the exemplary configuration of the video transmission system 1 illustrated in FIG. 1.

Figure 5:
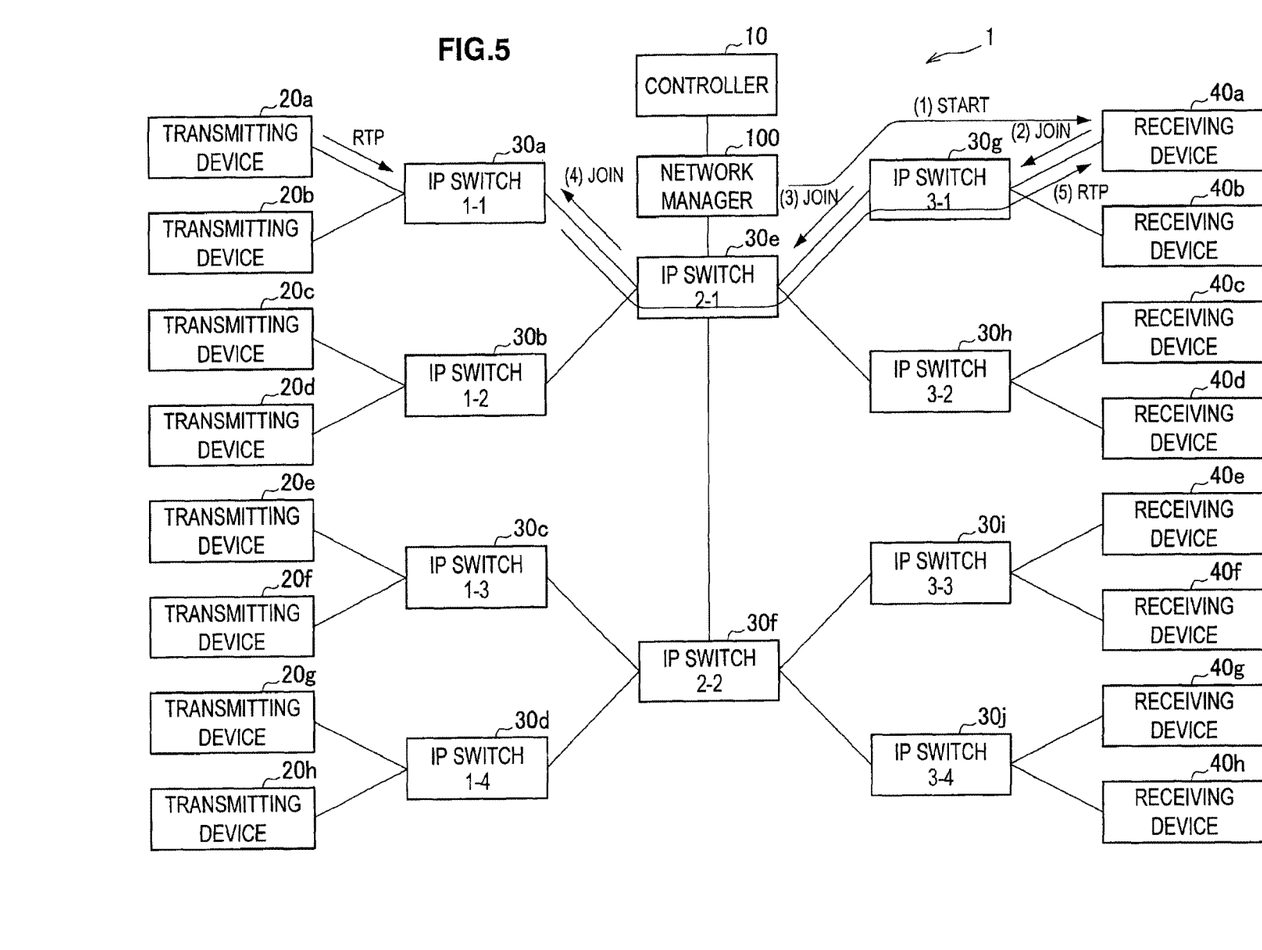
FIG. 5 is an explanatory drawing illustrating a manner in which a stream flows through a network in the video transmission system 1 according to an embodiment of the present disclosure.

FIG. 5 is an explanatory drawing illustrating the manner in which a stream flows through the network in the video transmission system 1 according to an embodiment of the present disclosure. Illustrated in FIG. 5 is the manner in which the stream flows through the network when the network manager 100 instructs the receiving device 40a to receive a video stream distributed from the transmitting device 20a via IP multicast in a case in which the video transmission system 1 according to an embodiment of the present disclosure has a configuration illustrated in FIG. 1. Note that the video stream that is distributed from the transmitting device 20a via IP multicast flows to the IP switch 30a with the Real-time Transport Protocol (RTP).

When the network manager 100 instructs the receiving device 40a to receive the video stream that is distributed from the transmitting device 20a via IP multicast ((1) Start), the receiving device 40a issues a Join command in order to receive the video stream.

If no other device that receives the video stream that is distributed from the transmitting device 20a via IP multicast exists in the path between the transmitting device 20a and the receiving device 40a, the Join command issued by the receiving device 40a is forwarded to the IP switch 30a that is closest to the transmitting device 20a ((2) Join, (3) Join, (4) Join). When the Join command is forwarded to the IP switch 30a, the video stream that is distributed from the transmitting device 20a via IP multicast is made to flow to the receiving device 40a with the RTP ((5) Join).

Figure 6:
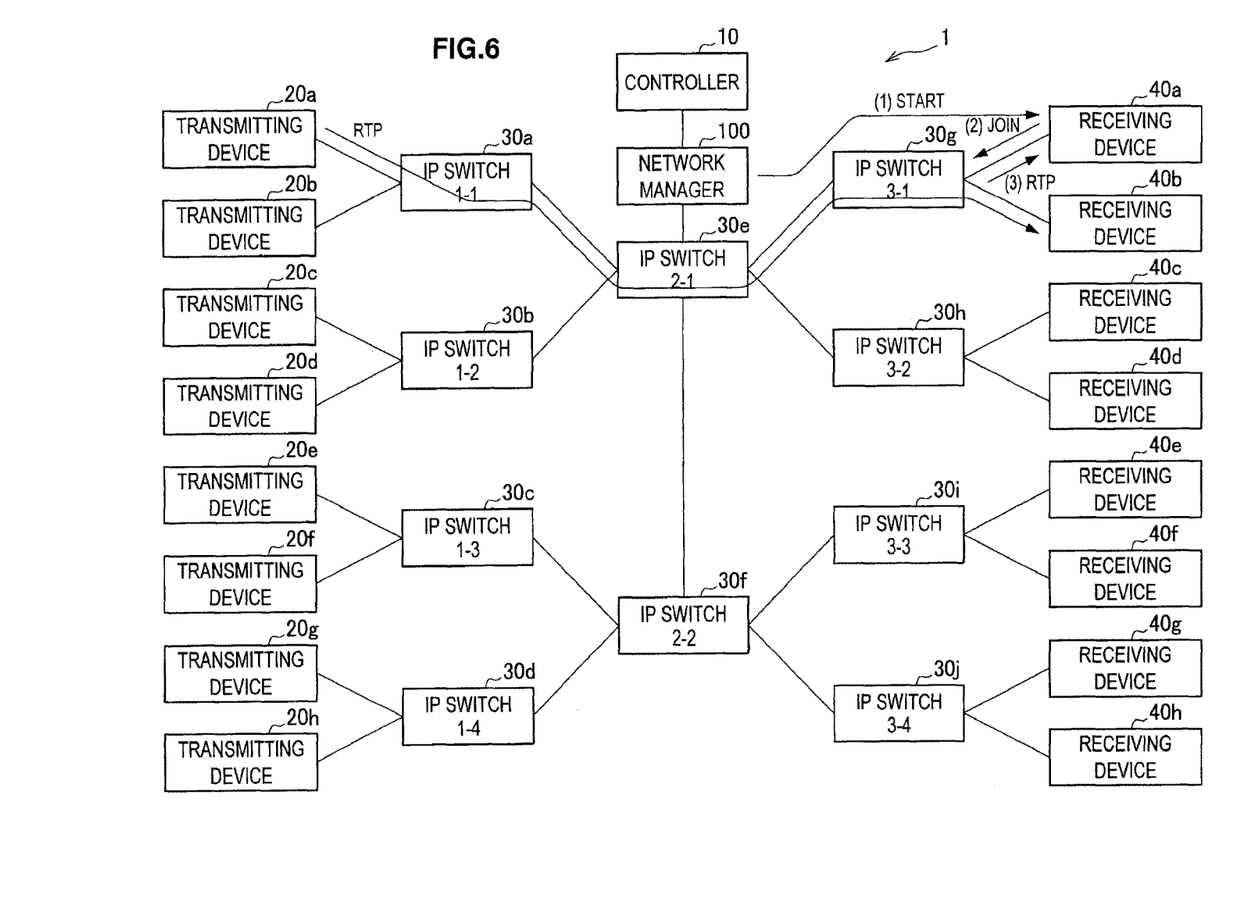
FIG. 6 is an explanatory drawing illustrating a manner in which a stream flows through the network in the video transmission system 1 according to an embodiment of the present disclosure.

FIG. 6 is an explanatory drawing illustrating the manner in which a stream flows through the network in the video transmission system 1 according to an embodiment of the present disclosure. Illustrated in FIG. 6 is the manner in which the stream flows through the network when the network manager 100 instructs the receiving device 40a to receive a video stream distributed from the transmitting device 20a via IP multicast in a case in which the video transmission system 1 according to an embodiment of the present disclosure has a configuration illustrated in FIG. 1. Note that the video stream that is distributed from the transmitting device 20a via IP multicast has already been received by the receiving device 40b and is assumed to have flowed to the IP switch 30g with the RTP.

When the network manager 100 instructs the receiving device 40a to receive the video stream that is distributed from the transmitting device 20a via IP multicast ((1) Start), the receiving device 40a issues a Join command in order to receive the video stream.

If another device that receives the video stream that is distributed from the transmitting device 20a via IP multicast exists in the path between the transmitting device 20a and the receiving device 40a, the Join command issued by the receiving device 40a is forwarded to the IP switch (the IP switch 30g in the example illustrated in FIG. 6) in which the video stream is flowing ((2) Join). When the Join command is forwarded to the IP switch 30g, the video stream that is distributed from the transmitting device 20a via IP multicast is made to flow to the receiving device 40a with the RTP ((3) Join).

By comparing the example illustrated in FIG. 5 and the example illustrated in FIG. 6, it can be understood that the time (hereinafter, the time is also referred to as a "switching time") for the video stream to become actually receivable by the receiving device 40a after the network manager 100 has sent out the instruction to receive the video stream to the receiving device 40a is different depending on where the video stream has arrived.

As above, even with the same instruction to receive the video stream, depending on where the video stream has arrived, the time for the video stream to reach the receiving devices 40a to 40h after the receiving devices 40a to 40h have received the instruction to receive the video stream differs. Accordingly, when sending out the instruction to receive the video stream to the receiving devices 40a to 40h, the network manager 100 considers the transmission state of the video stream and estimates the switching time in the receiving devices 40a to 40h. Then, when the switching time in the receiving devices 40a to 40h is estimated, the network manager 100 determines the timing to send out the instruction to receive the video stream while taking the estimated switching time into account.

Figure 7:
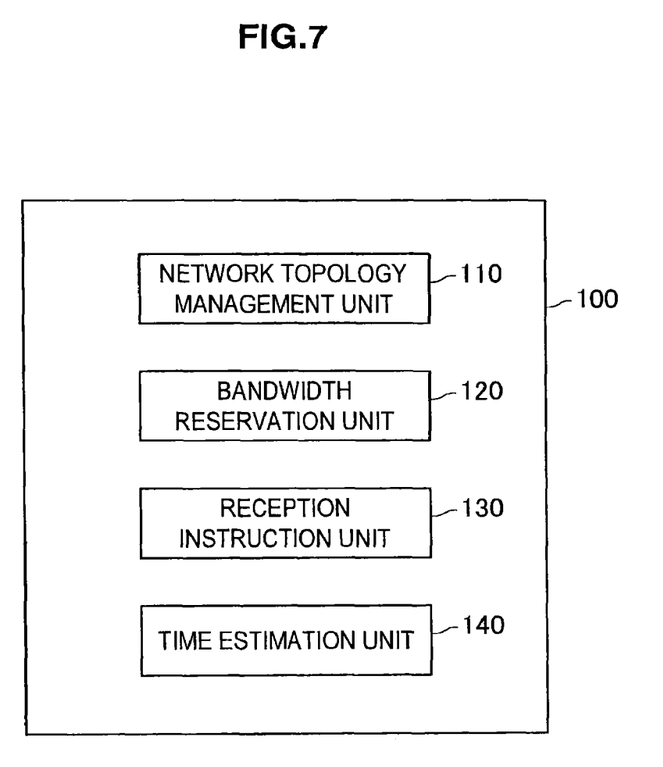
FIG. 7 is an explanatory drawing illustrating an exemplary functional configuration of the network manager 100 according to an embodiment of the present disclosure.

FIG. 7 is an explanatory drawing illustrating an exemplary functional configuration of the network manager 100 according to an embodiment of the present disclosure. The network manager 100 according to an embodiment of the present disclosure illustrated in FIG. 7 is a network manager 100 illustrated in FIG. 2 added with a time estimation unit 140. Hereinafter, the exemplary functional configuration of the network manager 100 according to an embodiment of the present disclosure will be described using FIG. 7.

When an instruction to receive the video stream is sent out to the receiving devices 40a to 40h from the controller 10, the time estimation unit 140 estimates the switching time of the video stream in the receiving devices 40a to 40h. The time estimation unit 140 estimates the switching time on the basis of statistical information collected in the network manager 100 in advance.

In the present embodiment, the network manager 100 measures, per each hop, the time from when the Join request is sent out from the receiving devices 40a to 40h until the video stream is made receivable with the RTP.

For example, in a case in which a video stream that is distributed from the transmitting device 20a via IP multicast has been sent to the IP switch 30a, it is assumed that, as a result of measuring the time from when a Join request is sent out until the video stream is received, the mean value of the time is a_1. The network manager 100 retains the mean value a_1 of the time in the network topology management unit 110, for example.

Similarly, in a case in which a video stream that is distributed from the transmitting device 20a via IP multicast has been sent to the IP switch 30e, it is assumed that, as a result of measuring the time from when a Join request is sent out until the video stream is received, the mean value of the time is a_2. The network manager 100 retains the mean value a_2 of the time in the network topology management unit 110, for example.

Furthermore, in a similar manner, in a case in which a video stream that is distributed from the transmitting device 20a via IP multicast has been sent to the IP switch 30g, it is assumed that, as a result of measuring the time from when a Join request is sent out until the video stream is received, the mean value of the time is a_3. The network manager 100 retains the mean value a_3 of the time in the network topology management unit 110, for example.

The time estimation unit 140 may use information on a load of the IP switch 30 when estimating the switching time. The load on the IP switch 30 is different between a case in which a video stream is not flowing through the IP switch 30 at all and a case in which a video stream is already flowing therethrough. In other words, the time taken from when a Join command is received by the IP switch 30 until the start of the RTP transmission of the video stream is different between a case in which a video stream is not flowing through the IP switch 30 at all and a case in which a video stream is already flowing therethrough.

The network manager 100 collects the time taken from when a Join command is received until the start of the RTP transmission of the video stream for each of the transmitted video streams and for all the IP switches 30a to 30j.

In a case in which the number of streams that can be transmitted by the IP switches 30a to 30j is n, when the IP switches 30a to 30j are not transmitting any video stream, it is assumed that, as a result of measuring the time taken from when a Join command is received until the start of the RTP transmission of the video stream, the mean value of the time is c_0. The network manager 100 retains the mean value c_0 of the time in the network topology management unit 110, for example. Furthermore, in a case in which n number of streams are transmitted by the IP switches 30a to 30j, it is assumed that, as a result of measuring each of the time taken from when a Join command is received until the start of the RTP transmission of the video stream, the mean value of the time is c_n. The network manager 100 retains the mean value c_n of the time in the network topology management unit 110, for example.

Note that the network manager 100 may obtain only the mean values c_0 and c_n, and obtain the values of the video streams with the number between 0 and n with the mean values c_0 and c_n by assuming that the values of the video streams with the number between 0 and n have a proportional relation.

In a case in which, from the network topology status and the status of the video stream flowing through the network, the target video stream is transmitted to IP switch x and the IP switch x is transmitting y number of video streams, the time estimation unit 140 estimates a switching time t of the video with the following equation. Note that z in the following equation is a safety factor having the network delay into consideration.

$$t = a\_x + c\_0 + (c\_n - c\_0) \times y/n + z$$

Figure 8:
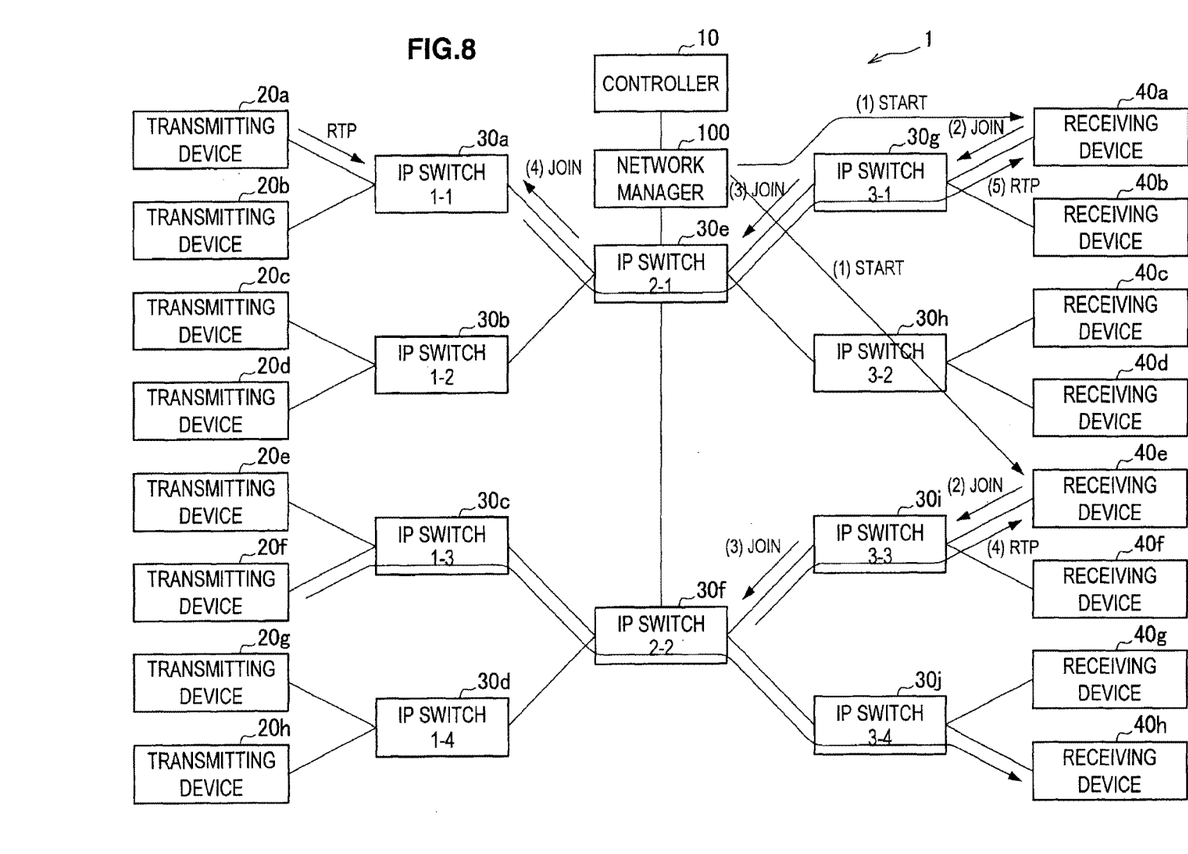
FIG. 8 is an explanatory drawing illustrating a manner in which streams flow through the network in the video transmission system 1 according to an embodiment of the present disclosure.

FIG. 8 is an explanatory drawing illustrating the manner in which streams flow through the network in the video transmission system 1 according to an embodiment of the present disclosure. Illustrated in FIG. 8 is the manner in which the streams flow through the network when the videos are switched in the receiving devices 40a and 40e at the same time by instructions of the network manager 100 given to the receiving device 40a to receive a video stream distributed from the transmitting device 20a via IP multicast and to the receiving device 40e to receive a video stream distributed from the transmitting device 20f via IP multicast in a case in which the video transmission system 1 according to an embodiment of the present disclosure has a configuration illustrated in FIG. 1.

Note that the video stream that is distributed from the transmitting device 20a via IP multicast is assumed to have flowed to the IP switch 30a with the RTP. Furthermore, the video stream that is distributed from the transmitting device 20f via IP multicast has already been received by the receiving device 40h and is assumed to have flowed to the IP switch 30f with the RTP.

As illustrated in FIG. 8, when a video stream is flowing through the network, the network manager 100 estimates the switching time in the transmitting device 20a and the switching time in the transmitting device 20e. Since the video stream distributed from the transmitting device 20a via IP multicast has flowed from the transmitting device 20a to the IP switch 30a on the first hop and the video stream distributed from the transmitting device 20f via IP multicast has flowed from the transmitting device 20f to the IP switch 30f on the second hop, it is assumed that the network manager 100 has estimated that the switching time in the transmitting device 20e is shorter. In such a case, the network manager 100 first sends out an instruction to receive the video stream to the transmitting device 20a estimated to have a longer switching time and, then, sends out an instruction to receive the video stream to the transmitting device 20e.

As described above, in the present embodiment, when switching the received video streams, there will be a time in which two video streams are received temporarily. In order to receive two video streams, a bandwidth for distributing two video streams is required, and since the securement of the bandwidth for two video streams is temporary, the shorter the time in which the bandwidth for two video streams is secured, the more desirable it is. By estimating the switching time in each device, the network manager 100 is capable of sending out, at suitable timings that allow the network bandwidths to be not used more than required when switching the video in each of the devices, instructions to receive the video stream in accordance with the network topology and the status of the video streams flowing through the network.

[Exemplary Format of Message]

Figure 9:
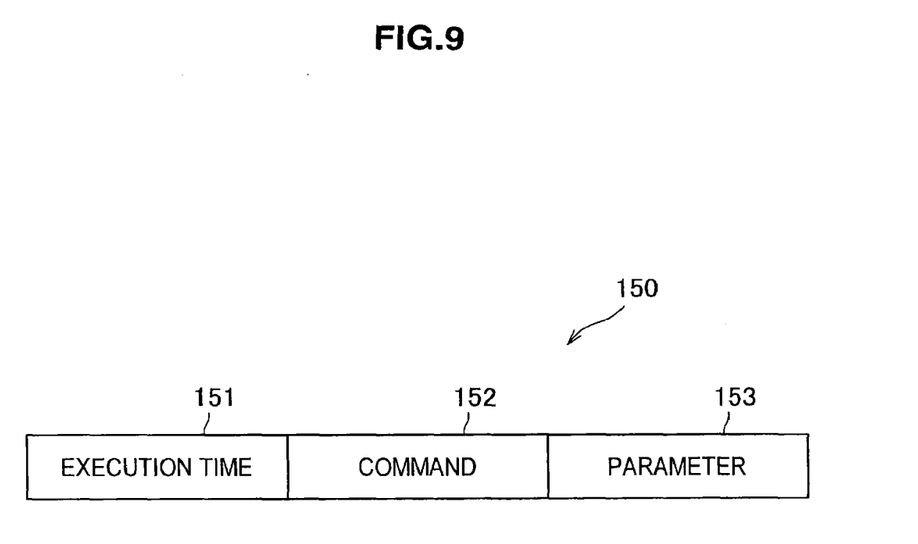
FIG. 9 is an explanatory drawing illustrating an exemplary format of a message.

FIG. 9 is an explanatory drawing illustrating an exemplary format of a message sent out from the network manager 100 to the receiving devices 40a to 40h. A message 150 illustrated in FIG. 9 includes an execution time 151, a command 152, and a parameter 153.

Time to receive the video stream and to execute output of the video based on the received video stream is described in the execution time 151. The receiving devices 40a to 40h change the video stream that is received when the time described in the execution time 151 is reached. A command (a Start command) that instructs reception of the video stream is described in the command 152. Information on the parameters designated to the receiving devices 40a to 40h when receiving the video stream is described in the parameter 153.

[Modification]

As described above, the network manager 100 according to an embodiment of the present disclosure reserves a bandwidth for the video stream that is to be newly received by the receiving devices 40a to 40h. When there is room in the network bandwidth of the video transmission system 1, the network manager 100 may distribute the video stream to the IP switch that is close to the receiving devices 40a to 40h in advance.

Figure 10:
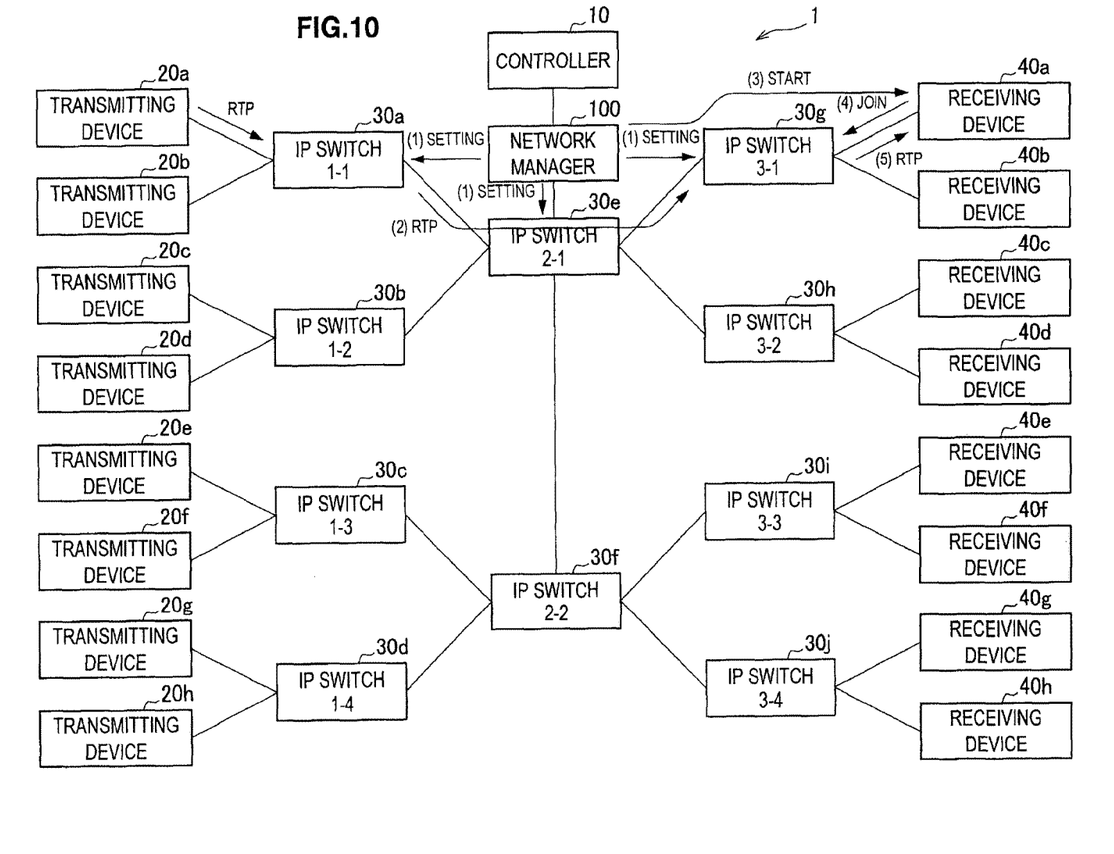
FIG. 10 is an explanatory drawing illustrating a manner in which a stream flows through the network in the video transmission system 1 according to an embodiment of the present disclosure.

FIG. 10 is an explanatory drawing illustrating the manner in which a stream flows through the network in the video transmission system 1 according to an embodiment of the present disclosure. Illustrated in FIG. 10 is the manner in which the stream flows through the network when the network manager 100 instructs the receiving device 40a to receive a video stream distributed from the transmitting device 20a via IP multicast in a case in which the video transmission system 1 according to an embodiment of the present disclosure has a configuration illustrated in FIG. 1. Note that the video stream that is distributed from the transmitting device 20a via IP multicast is assumed to have flowed to the IP switch 30a with the RTP.

On the basis of information on the network topology and information on the flowing video stream, the network manager 100 examines whether there is room in the network bandwidth of the path between the transmitting device 20a to the receiving device 40a with, for example, the bandwidth reservation unit 120. The network manager 100 may determine whether there is room in the network bandwidth by determining whether a video stream that flows through the path from the transmitting device 20a to the receiving device 40a exists. Furthermore, the network manager 100 may determine whether there is room in the network bandwidth by determining whether the network bandwidth will be used to exceed a predetermined threshold value when the video stream that is distributed from the transmitting device 20a is made to flow.

When there is room in the network bandwidth of the path from the transmitting device 20a to the receiving device 40a, the network manager 100 reserves the bandwidth for the video stream distributed from the transmitting device 20a and, further, performs setting such that the video stream distributed from the transmitting device 20a can be made to flow to the IP switch 30g in advance ((1) Setting). On the basis of the settings set by the network manager 100, the IP switches 30a, 30e, and 30g distribute the video stream distributed from the transmitting device 20a to the IP switch 30g ((2) RTP).

Then, when the designated time is reached in the controller 10, the network manager 100 sends out, to the receiving device 40a, an instruction to receive the video stream distributed from the transmitting device 20a ((3) Start). At this point, since the video stream distributed from the transmitting device 20a has already flowed to the IP switch 30g, when a Join command is sent to the IP switch 30g from the receiving device 40a ((4) Join), the video stream distributed from the transmitting device 20a is transmitted from the IP switch 30g to the receiving device 40a ((5) RTP).

As described above, if there is room in the network bandwidth, by distributing the video stream to the IP switch that is close to the receiving devices 40a to 40h in advance, the network manager 100 can shorten the switching time in the receiving devices 40a to 40h.

2. Summary

As described above, according to an embodiment of the present disclosure, the network manager 100 is provided that enables, in a case in which videos distributed via IP multicast are received by the receiving devices 40a to 40h, the video to be undistracted from between when the video of the video stream that has been received until then is output until the video of the video stream that is newly received is output.

When an instruction given to the receiving devices 40a to 40h to receive the video stream is acquired from the controller 10, the network manager 100 secures a network bandwidth for transmitting the video stream to the receiving devices 40a to 40h. Furthermore, when the designated time is reached in the controller 10 or promptly after the network bandwidth is secured, the network manager 100 sends out an instruction to receive the video stream designated by the controller 10 to the receiving devices 40a to 40h designated by the controller 10.

As described above, the network manager 100 according to an embodiment of the present disclosure secures the network bandwidth for transmitting the video stream sent to the receiving devices 40a to 40h through distribution from the transmitting devices 20a to 20h via IP multicast. By securing the network bandwidth in the above manner, the network manager 100 according to an embodiment of the present disclosure can switch videos in the receiving devices 40a to 40h without distorting the videos output by the receiving devices 40a to 40h.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A controller including:

a bandwidth reservation unit configured to, when an instruction given to a receiving device that receives a first video stream transmitted via IP multicast to receive a second video stream after receiving the first video stream is acquired, acquire information on a status of a network topology and a transmitted video stream and to reserve a network bandwidth for transmitting the second video stream in addition to the first video stream; and a reception instruction unit configured to send out an instruction to receive the second video stream to the receiving device by using the network bandwidth reserved by the bandwidth reservation unit.

(2)
The controller according to (1), further including:
a time estimation unit configured to, on a basis of the information on the status of the network topology and the transmitted video stream, estimate a time from when the instruction to receive the second video stream is sent out to the receiving device until the second video stream is received.
(3)
The controller according to (2),
wherein time estimation unit estimates the time from when the instruction to receive the second video stream is sent out to the receiving device until the second video stream is received by using information on a time from when a request of the video stream is made until the video stream is received, the time being acquired in advance per each hop number between a node where the transmitted video stream has reached and the receiving device.
(4)
The controller according to (2) or (3),
wherein by using information related to a load on a node where the transmitted video stream has reached, the time estimation unit estimates the time from when the instruction to receive the second video stream is sent out to the receiving device until the second video stream is received.
(5)
The controller according to (4),
wherein the information related to the load on the node is information on a relationship between a number of the video streams that is already flowing in the node and a time when transmission of a new video stream is started in the node.
(6)
The controller according to any of (1) to (5),
wherein when receiving a notification of ending a reception of the first video stream from the receiving device, the bandwidth reservation unit releases the bandwidth secured for the first video stream.
(7)
The controller according to any of (1) to (6),
wherein the reception instruction unit sends out the instruction to receive the second video stream to the receiving device at a designated time.
(8)
The controller according to any of (1) to (7),
wherein the bandwidth reservation unit determines whether the second video stream is to be transmitted to a node immediately before the receiving device on a basis of the acquired information on the status of the network topology and the transmitted video stream.
(9)
The controller according to any of (1) to (8), further including:
a network topology management unit that manages the network topology by using information collected from a device in a network.
(10)
A control method including:
acquiring, when an instruction given to a receiving device that receives a first video stream transmitted via IP multicast to receive a second video stream after receiving the first video stream is acquired, information on a status of a network topology and a transmitted video stream and reserving a network bandwidth for transmitting the second video stream in addition to the first video stream; and
sending out an instruction to receive the second video stream to the receiving device by using the reserved network bandwidth.
(11)
A computer program causing a computer to execute:
acquiring, when an instruction given to a receiving device that receives a first video stream transmitted via IP multicast to receive a second video stream after receiving the first video stream is acquired, information on a status of a network topology and a transmitted video stream and reserving a network bandwidth for transmitting the second video stream in addition to the first video stream; and
sending out an instruction to receive the second video stream to the receiving device by using the reserved network bandwidth.
(12)
A video transmission system including:
one or more transmitting devices that transmit a video stream via IP multicast;
a receiving device that receives the video stream transmitted from the one or more transmitting devices via IP multicast; and
a controller that transmits an instruction to receive a video stream to the receiving device,
wherein the controller includes
a bandwidth reservation unit configured to, when an instruction given to the receiving device that receives a first video stream transmitted from the one or more transmitting devices via IP multicast to receive a second video stream after receiving the first video stream is acquired, acquire information on a status of a network topology and a transmitted video stream and to reserve a network bandwidth for transmitting the second video stream in addition to the first video stream, and
a reception instruction unit configured to send out an instruction to receive the second video stream to the receiving device by using the network bandwidth reserved by the bandwidth reservation unit.

REFERENCE SIGNS LIST 1 video transmission system
10 controller
20a to 20h transmitting device
30a to 30j IP switch
40a to 40h receiving device
100 network manager
110 network topology management unit
120 bandwidth reservation unit
130 reception instruction unit
140 time estimation unit

The invention claimed is:
1. A controller comprising:
circuitry configured to:
in the event that an instruction for a receiving device receiving a first video stream transmitted via IP multicast is received, acquire information on a status of a network topology and a transmitted video stream and reserve a network bandwidth for transmitting a second video stream in addition to the first video stream; and
send to the receiving device, the instruction to receive the second video stream via a network of which the network bandwidth is reserved,
wherein the instruction is for the receiving device to change from receiving the first stream to receiving the second stream, and wherein the network bandwidth for transmitting the second video stream is reserved before the receiving device sends a request for receiving the second video stream.

2. The controller according to claim 1, wherein the circuitry is further configured to, based on the information on the status of the network topology and the transmitted video stream, estimate a time from when the instruction to receive the second video stream is sent out to the receiving device until the second video stream is received.

3. The controller according to claim 2, wherein the circuitry is further configured to estimate the time from when the instruction to receive the second video stream is sent out to the receiving device until the second video stream is received by using information on a time from when a request of the second video stream is made until the second video stream is received, the time being acquired in advance per each hop number between a node where the transmitted video stream has reached and the receiving device.

4. The controller according to claim 2, wherein by using information related to a load on a node where the transmitted video stream has reached, the circuitry is further configured to estimate the time from when the instruction to receive the second video stream is sent out to the receiving device until the second video stream is received.

5. The controller according to claim 4, wherein the information related to the load on the node is information on a relationship between a number of video streams that is already flowing in the node and a tune when transmission of a new video stream is started in the node.

6. The controller according to claim 1, wherein when receiving a notification of ending a reception of the first video stream from the receiving device, the circuitry is further configured to release the bandwidth secured for the first video stream.

7. The controller according to claim 1, wherein the circuitry is further configured to send out the instruction to receive the second video stream to the receiving device at a designated time.

8. The controller according to claim 1, wherein the circuitry is further configured to determine whether the second video stream is to be transmitted to a node immediately before the receiving device based on the acquired information on the status of the network topology and the transmitted video stream.

9. The controller according to claim 1, wherein the circuitry is further configured to manage the network topology by using information collected from a device in the network.

10. A control method comprising:
acquiring, in the event that an instruction for a receiving device receiving a first video stream transmitted via IP multicast is received, information on a status of a network topology and a transmitted video stream and reserving a network bandwidth for transmitting a second video stream in addition to the first video stream; and
sending to the receiving device, the instruction to receive the second video stream via a network of which the network bandwidth is reserved,
wherein the instruction is for the receiving device to change from receiving the first stream to receiving the second stream, and
wherein the network bandwidth for transmitting the second video stream is reserved before the receiving device sends a request for receiving the second video stream.

11. A non-transitory computer readable medium storing a computer program when executed by a computer, causes the computer to perform a method comprising:
acquiring, in the event that an instruction for a receiving device receiving a first video stream transmitted via IP multicast is received, information on a status of a network topology and a transmitted video stream and reserving a network bandwidth for transmitting a second video stream in addition to the first video stream; and
sending to the receiving device, the instruction to receive the second video stream via a network of which the network bandwidth is reserved,
wherein the instruction is for the receiving device to change from receiving the first stream to receiving the second stream, and
wherein the network bandwidth for transmitting the second video stream is reserved before the receiving device sends a request for receiving the second video stream.

12. A video transmission system comprising:
one or more transmitting devices that transmit a video stream via IP multicast;
a receiving device that receives the video stream transmitted from the one or more transmitting devices via IP multicast; and
a controller that transmits an instruction to receive a video stream to the receiving device,
wherein the controller includes circuitry configured to:
in the event that an instruction for the receiving device receiving a first video stream transmitted from the one or more transmitting devices via IP multicast is received, acquire information on a status of a network topology and a transmitted video stream and reserve a network bandwidth for transmitting a second video stream in addition to the first video stream, and
send to the receiving device, the instruction to receive the second video stream via a network of which the network bandwidth is reserved,
wherein the instruction is for the receiving device to change from receiving the first stream to receiving the second stream, and
wherein the network bandwidth for transmitting the second video stream is reserved before the receiving device sends a request for receiving the second video stream.

* * * * *